Figure 1:
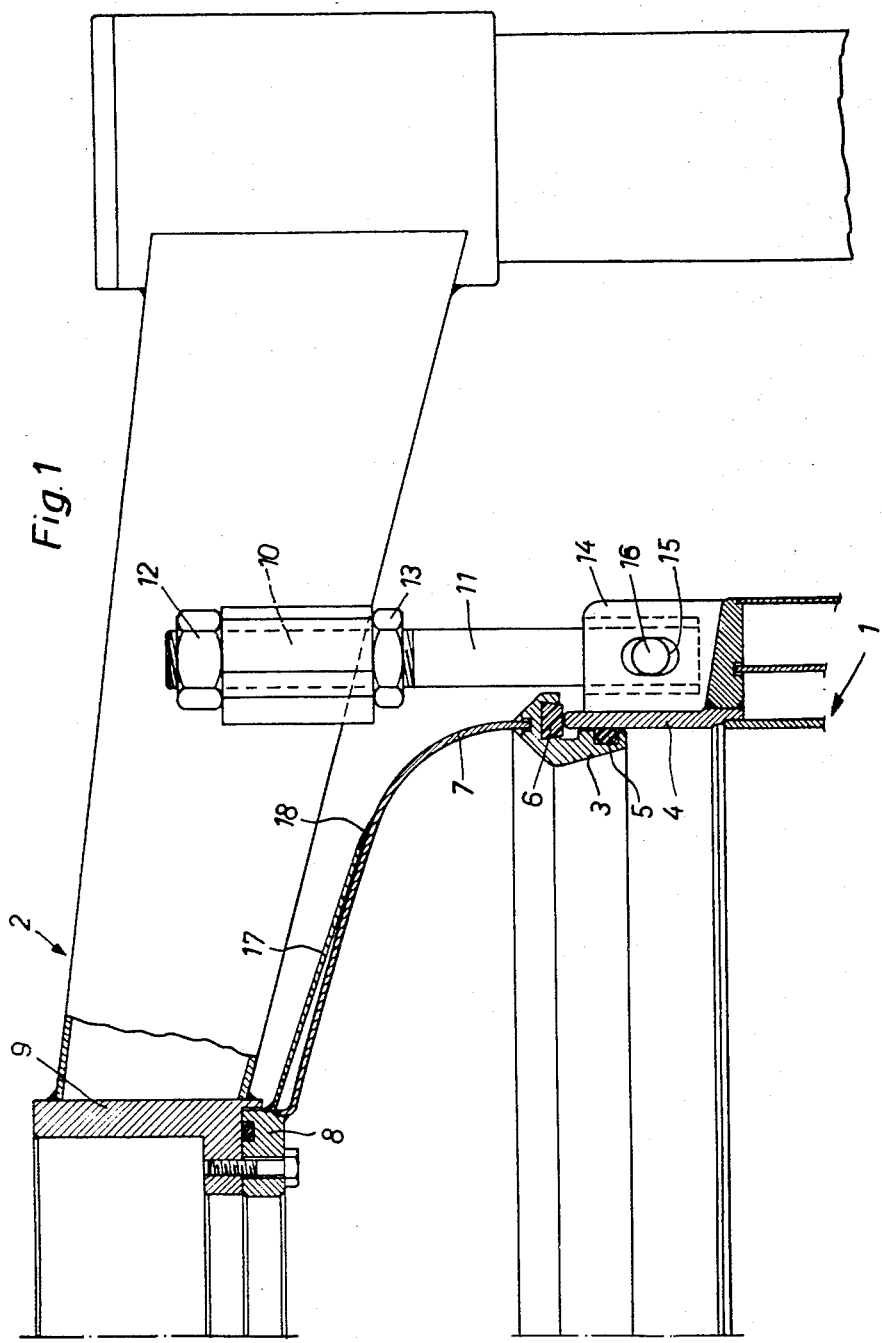

April 15, 1969  O. KRIEGER  3,438,541
COVER ARRANGEMENT FOR CLOSING AND SEALING A PRESSURE VESSEL
Filed Nov. 29, 1966

INVENTOR.
OSKAR KRIEGER
BY
Anderson, Luedeka, Fitch, Even, & Tabin

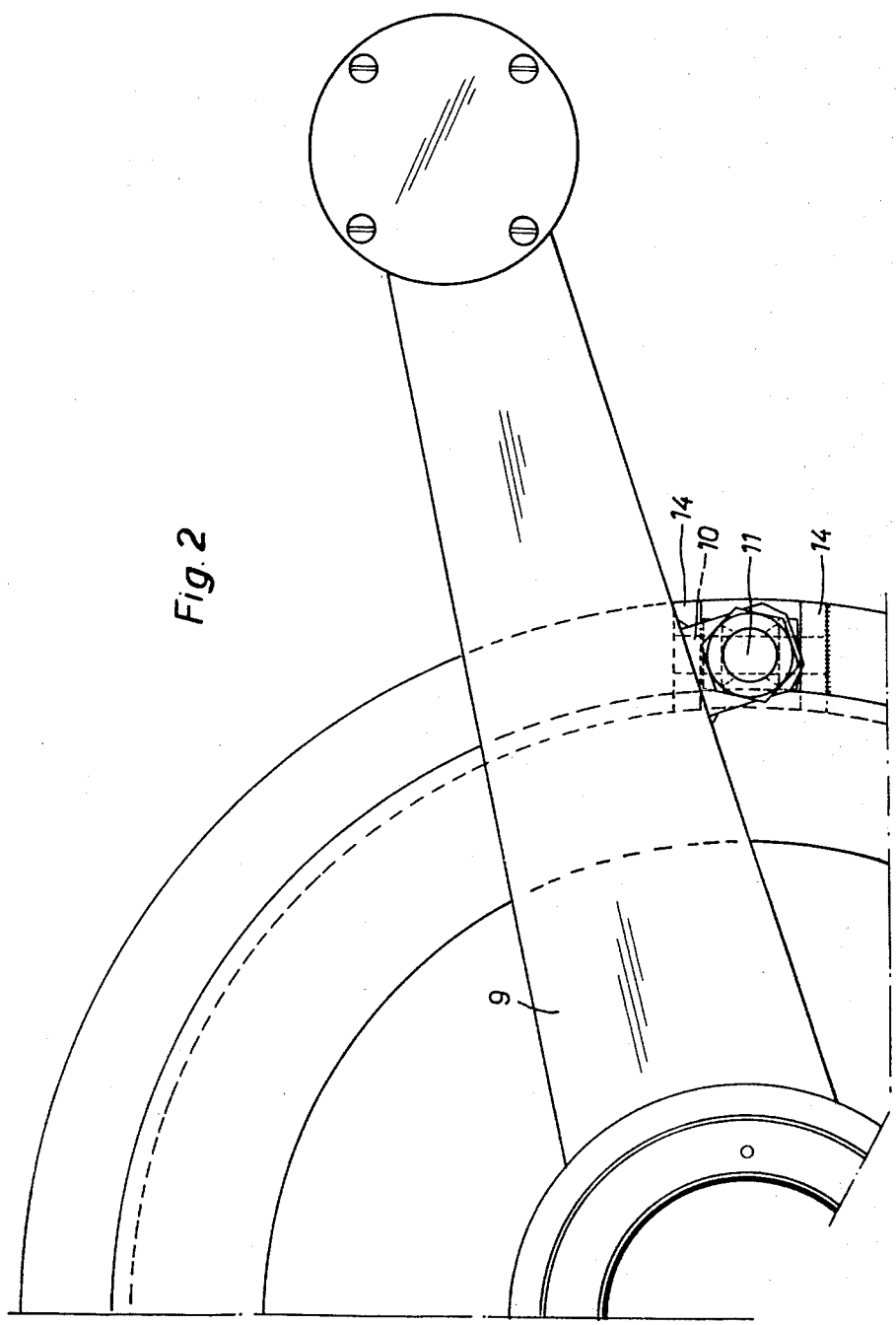

3,438,541
COVER ARRANGEMENT FOR CLOSING AND
SEALING A PRESSURE VESSEL
Oskar Krieger, 22 Kreuznagelweg, Muttenz,
Basel-Land, Switzerland
Filed Nov. 29, 1966, Ser. No. 597,716
Claims priority, application Switzerland, Dec. 13, 1965,
17,122/65
Int. Cl. B65d 53/00, 45/00; A47j 27/08
U.S. Cl. 220—46                     8 Claims The invention relates to a cover arrangement for closing and sealing vessels under a positive or a negative pressure.

An object of the invention is a cover arrangement of this nature that provides an effective seal for positive and negative pressure vessels, while leaving the rim of the cover uncluttered by clamps and such like.

This and further objects of the invention will be apparent from the following detailed description of one embodiment of the invention read in conjunction with the drawings, wherein:

FIGURE 1 is a partly sectional side view of a part of the cover arrangement of the invention, and FIGURE 2 is a top view of the part of the cover shown in FIGURE 1.

The generally cylindrical pressure vessel 1 (which may be a mixing vessel, for example) has an opening symmetrical to the axis of the vessel and closed by a liquid and gas tight cover arrangement 2. The cover arrangement extends over a ring 3, which acts as a centering ring that partly projects down into the vessel and partly projects radially outward immediately above the vessel wall 4. An O-sealing ring 5 is located in a groove of the ring 3 between the inside surface of the wall 4 and the opposed wall of the ring 3. A second sealing ring 6 is located in a groove of the centering ring 3 between the upper edge of the vessel wall 4 and the opposed surface of the ring 3. In cross section the upper part of the ring 3 is V-shaped and incorporates a third groove in which a more or less dome-shaped relatively thin cover element 7 is welded. The cover proper is composed of the ring 3 and the cover element 7. The cover element terminates in a central flange 8 to which a yoke 9 is bolted. The yoke incorporates two diametrically opposite arms (only one shown) operated by fluid operated lifters (not shown) for raising and lowering the arms and therefore the cover 2. The yoke includes a barrel sealingly seated on the flange 8. The barrel incorporates an opening having a shoulder for supporting a mixing or kneading apparatus (not shown) that projects through the opening in the flange 8 into the interior of vessel. To increase the rigidity of the relatively thin cover element 7, there is provided a conically shaped reinforcing plate 17 which is welded to the flange 8 and at 18 to the upper surface of the cover element 7.

A sleeve 10 is welded to each arm of the yoke. In the illustrated embodiment the sleeves are welded only to the arms, but they could also be located at the height of the yoke barrel, and secured also to the barrel by one or more rods. A bolt 11 extends downwardly through each sleeve 10 in the axial direction of the vessel. The length of the bolt neighboring the sleeve is threaded, and the bolt is secured to the sleeve by a nut 12, 13 at each end of the sleeve. The lower end of each bolt is engaged by two side plates 14 welded to the vessel, each incorporating a longitudinal aperture 15 aligned with the aperture of the other plate. The two apertures of a pair of plates 14 accept a transverse pin 16 extending through a bore in the bolt. The diameter of bolt bore, as well as the width of the apertures, is approximately equal to the diameter of the pin. The arrangement permits the cover arrangement to move up and down in a direction at least substantially parallel to that of the cover arrangement when the cover (members 7 and 3) is put on the vessel opening.

The invention works in the following manner:

The lifters set the cover arrangement 2 down on the vessel. The cover arrangement is then coupled to the vessel by inserting the pin 16 of each bolt 11 through an aperture 15, the aligned bore of bolt 11, and the aligned aperture 15 of the other plate 14 of the pair. When the pressure in the vessel is equal to that outside of the vessel, the pins 16 are approximately centered along the length of the aperture. After the cover arrangement is coupled, the lifter is released.

If the vessel interior is under a positive pressure, the cover arrangement is forced upwards until the pins 16 engage the upper ends of the apertures 15. The upper sealing ring 6 is separated from the rim of the wall 4, but the lower sealing ring 5 is squeezed by the pressure tightly against the centering ring and the inner surface of the wall 4.

If the vessel interior is under negative pressure, the cover arrangement 2 is forced downwards, bringing the ring 6 into sealing engagement with the upper edge of wall 4.

The invention is suitable for vessels under positive or negative pressure. The invention affords a particularly good sealing action with vessels under negative pressure, because both sealing rings 5 and 6 are in sealing engagement with the wall 4.

The arrangement of the invention provides an easily and quickly operated closure having a circumferentially held cover, but which avoids clamps along the vessel rim. The rim of the vessel is thus uncluttered. The arrangement assures a satisfactory seal whether the vessel is under negative or positive pressure.

I claim:

1. A sealing cover arrangement for positive and negative pressure vessels, comprising a vessel having an opening; a cover for the opening of the vessel; a first groove associated with said cover and facing the inside rim of said vessel at the opening thereof; a second groove associated with said cover and facing the edge of said vessel opening; a sealing means in each of said grooves, the sealing means of said first groove always being in sealing contact with the groove and the inside rim when said cover is in place; and coupling means for releasably coupling said cover to said vessel and, while coupled and sealed to said vessel, allowing a limited movement for the cover in a direction substantially parallel to movement thereof when placed on the vessel opening, said coupling means including a plurality of anchoring means disposed about the outside of said vessel adjacent the rim of the vessel, means for securing said anchoring means to said cover, means including plates secured to said vessel at spaced positions for interlocking with said plurality of anchoring means, and removable pins interconnecting said anchoring means and said plate means to prevent unsealing and removal of said cover, elongated apertures in at least one of said anchoring or plate means being elongated in the direction of limited cover movement, said pins being movable in said elongated apertures while the cover is still sealed to said vessel, said pins being removable from said interlocking relationship with said anchoring and plate means to allow said cover to unseal and to be removed from said vessel opening.

2. The sealing cover arrangement as claimed in claim 1, wherein said cover comprises a member incorporating said first and second grooves and a dome-shaped cover element projecting over said vessel opening.

3. The sealing cover arrangement as claimed in claim 2, including a reinforcing plate for said cover element to render the latter rigid.

4. The sealing cover arrangement as claimed in claim 3, including a flange in which said cover element terminates and located remote from said member, said reinforcing plate being secured to said flange and to said cover element at a position intermediate said flange and said member.

5. The sealing cover arrangement as claimed in claim 4, wherein said member incorporates a groove in which said cover element is secured.

6. The sealing cover arrangement as claimed in claim 1, including a lifter-operated yoke comprising two opposed arms, said plurality of anchoring means being composed of two such means, and one of said anchoring means being secured to each of said arms, said yoke co-operating with said cover to raise and lower the latter.

7. The sealing cover arrangement as claimed in claim 6, wherein said anchoring means are elongated in the direction of said limited movement; a sleeve secured to each said arm for accepting a respective one of said anchoring means, each said anchoring means being threaded in the vicinity of a respective sleeve; and a nut threaded on each said anchoring means at each end of the sleeve for securing the anchoring means to the sleeve.

8. The sealing cover arrangement as claimed in claim 7, wherein said cover comprises a member incorporating said first and second grooves and a dome-shaped cover element projecting over said vessel opening; a reinforcing plate for said cover element to render the latter rigid; an annular flange in which said cover element terminates and located remote from said member, said reinforcing plate being secured to said flange and to said cover element at a position intermediate said flange and said member; a barrel-shaped member intermediate said two arms and secured thereto, said barrel-shaped member being aligned and secured to and in sealing engagement with said annular flange; and means incorporated with said barrel-shaped member and said flange for supporting apparatus for working on the contents of said vessel.

References Cited

UNITED STATES PATENTS

| | | | |
|---|---|---|---|
| 1,230,316 | 6/1917 | Napier | 220—34 |
| 1,389,542 | 8/1921 | Wereley | 220—46 |
| 2,559,193 | 7/1951 | Le Claire | 220—46 XR |
| 2,917,200 | 12/1959 | Phelan | 220—46 XR |

FOREIGN PATENTS 993,552  11/1951  France.

GEORGE E. LOWRANCE, Primary Examiner.

U.S. Cl. X.R.

220—55

U.S. DEPARTMENT OF COMMERCE
PATENT OFFICE
Washington, D.C. 20231

UNITED STATES PATENT OFFICE
CERTIFICATE OF CORRECTION

Patent No. 3,438,541 April 15, 19

Oskar Krieger

It is certified that error appears in the above identified patent and that said Letters Patent are hereby corrected as shown below:

Column 3, line 8, the claim reference numeral "4" should read -- 2 --.

Signed and sealed this 14th day of April 1970.

(SEAL)
Attest:

Edward M. Fletcher, Jr.
Attesting Officer

WILLIAM E. SCHUYLER, JR
Commissioner of Patents